United States Patent [19]

Evans

[11] Patent Number: 5,280,287
[45] Date of Patent: Jan. 18, 1994

[54] CODED IDENTIFICATION AND POSITIONING SYSTEM

[75] Inventor: Alan G. Evans, LaPlata, Md.

[73] Assignee: The United States of America as represented by the Secretary of the Navy, Washington, D.C.

[21] Appl. No.: 906,389

[22] Filed: Jun. 30, 1992

[51] Int. Cl.⁵ .................. G01S 13/78; G01S 13/80
[52] U.S. Cl. .................................. 342/45; 342/55
[58] Field of Search ............ 342/45, 53, 55, 54, 342/50, 13

[56] References Cited

U.S. PATENT DOCUMENTS

| | | | |
|---|---|---|---|
| 3,949,397 | 4/1976 | Wagner et al. | 342/45 |
| 4,315,609 | 2/1982 | McLean et al. | 244/3.14 |
| 4,566,009 | 1/1986 | Hanni et al. | 342/45 |
| 4,611,209 | 9/1986 | Lemelson et al. | 342/455 |
| 4,814,769 | 3/1989 | Robin et al. | 342/45 |
| 4,837,575 | 6/1989 | Conner, Jr. | 342/45 |
| 4,862,176 | 8/1989 | Voles | 342/45 |
| 4,949,089 | 8/1990 | Ruszkowski, Jr. | 342/52 |
| 5,023,888 | 6/1991 | Bayston | 342/189 X |
| 5,202,783 | 4/1993 | Holland et al. | 359/152 |
| 5,223,841 | 6/1993 | Ricker | 342/174 |

*Primary Examiner*—John B. Sotomayor
*Attorney, Agent, or Firm*—John D. Lewis; Jacob Shuster

[57] ABSTRACT

An Identification Friend or Foe (IFF) method and system are provided to detect i) friendly ground-based vehicles, ii) each of the vehicle's unique identity, and iii) each of the vehicle's approximate position. A video image of an area of interest on the ground is generated from an aircraft. The video image is defined by a matrix of pixels. A range from the aircraft to a reference position within the area of interest is provided. The reference position is defined by known latitude, longitude and height within the area of interest and is further defined in the matrix of pixels by matrix coordinates. A coded signal is transmitted from a vehicle on the ground to uniquely identify the vehicle and identify the vehicle as friendly. The coded signal is also detectable as part of the video image when the coded signal is transmitted from the area of interest. The vehicle position within the area of interest is thus defined in the matrix of pixels by matrix coordinates. Using image processing techniques, offset distances between the reference position defined by matrix coordinates and the vehicle position defined by matrix coordinates are determined. The range to the reference position and the determined offset distances are indicative of the vehicle's latitude, longitude and height within the area of interest.

15 Claims, 2 Drawing Sheets

CODED IDENTIFICATION AND POSITIONING SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to Identification Friend or Foe (IFF) systems, and more particularly to an IFF system that enables a friendly aircraft to recognize friendly vehicles on the ground and simultaneously identify each vehicle and provide an estimate of each vehicle's location.

BACKGROUND OF THE INVENTION

The identification of friendly ground-based equipment and/or vehicles (hereinafter referred to as vehicles) from a military aircraft is of paramount concern in combat operations. Accordingly, numerous Identification Friend or Foe (IFF) systems have been developed to enable friendly vehicles to clearly indicate their affiliation with associated friendly aircraft.

A simple example of an IFF system is constant-on, visual recognition system in which each vehicle is constantly emitting a visual (friendly) signal that may be seen by the pilots of the aircraft flying overhead. Other IFF systems that are more complex in nature include interrogation IFF systems in which ground-based vehicles emit a (friendly) infrared or radio signal only when in receipt of an acceptable interrogation signal from overhead aircraft. Security for both simple and complex IFF systems is typically achieved by coding the interrogation and friendly signals so that opposing forces cannot detect and/or duplicate same. Representative examples of such IFF systems are disclosed in U.S. Pat. No. 4,814,769 issued to Robin et al. on Mar. 21, 1989, U.S. Pat. No. 4,837,575 issued to Conner, Jr. on Jun. 6, 1989, and U.S. Pat. No. 4,862,176 issued to Voles on Aug. 29, 1989. Each of these prior art IFF systems provides a method/system for identifying a vehicle as a friend or foe.

While identifying a particular vehicle as friendly is paramount at the field operation level, this recognition does not provide enough information for command level observation of the larger theater of combat or training operations. At the command level, it is also desirable to know a vehicle's identity and position in order to evaluate current conditions and plan for the future.

SUMMARY OF THE INVENTION

Accordingly, it is an object of the present invention to provide a method and apparatus that enables an aircraft to recognize friendly vehicles on the ground, and simultaneously identify each vehicle and provide an estimate of each vehicle's location.

Other objects and advantages of the present invention will become more obvious hereinafter in the specification and drawings.

In accordance with the present invention, an Identification Friend or Foe (IFF) method and system are provided to detect i) friendly ground-based vehicles, ii) each of the vehicle's unique identity, and iii) each of the vehicle's approximate position. A video image of an area of interest on the ground is generated from an aircraft. The video image is defined by a matrix of pixels. A range from the aircraft to a reference position within the area of interest is provided. The reference position is defined by known latitude, longitude and height within the area of interest and is further defined in the video images's matrix of pixels by matrix coordinates. A coded signal is transmitted from a vehicle on the ground to uniquely identify the vehicle and identify the vehicle as friendly. The coded signal is also detectable as part of the video image when the coded signal is transmitted from the area of interest. The vehicle position within the area of interest is thus defined in the video image's matrix of pixels by matrix coordinates. Using image processing techniques, offset distances between the reference position defined by matrix coordinates and the vehicle position defined by matrix coordinates are determined. The range to the reference position and the determined offset distances are indicative of the vehicle's latitude, longitude and height within the area of interest.

DETAILED DESCRIPTION OF THE INVENTION

Figure 1:
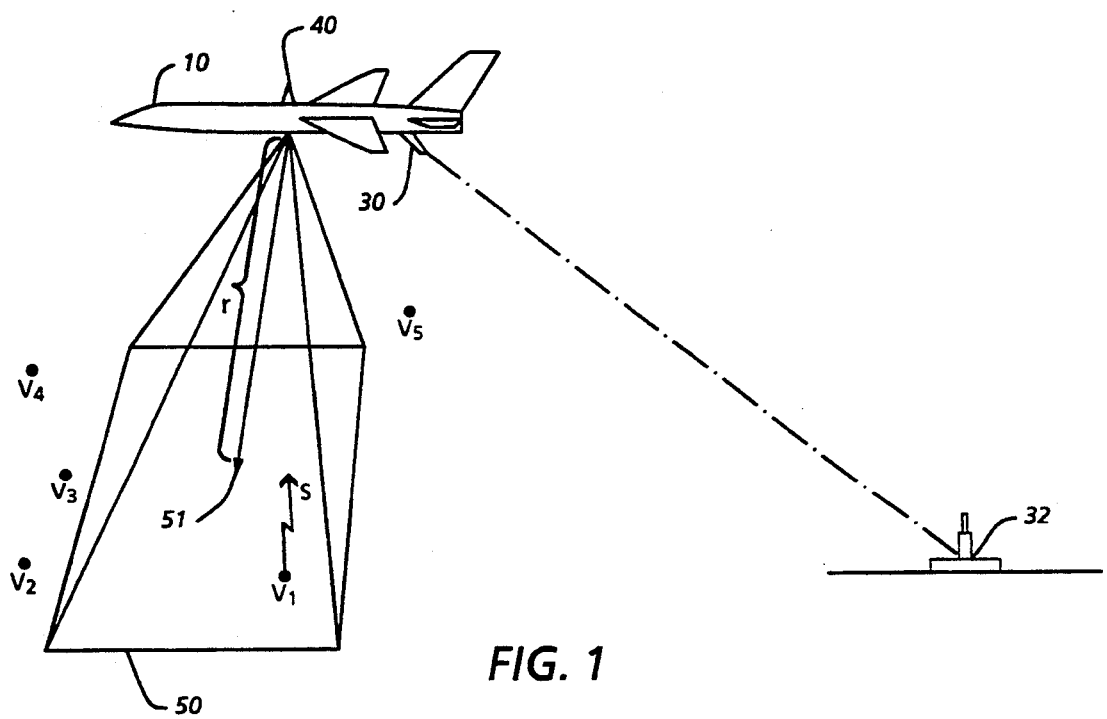
FIG. 1 is a diagram explaining a mode of operation in accordance with the present invention.

Referring now to the drawings, and more particularly to the situation depicted in FIG. 1, the essential aspects of the method of the present invention will now be explained. An aircraft 10 is shown flying above the ground. Aircraft 10 is typically equipped with high precision position and attitude determination apparatus as is well known in the art. By way of example, aircraft 10 may be equipped with a Global Positioning System (GPS) antenna 30 which receives precise relative position information from a known location, groundbased GPS antenna 32. The GPS data is typically combined with data from an inertial navigation system (INS) 40 onboard aircraft 10 to precisely generate the attitude of aircraft 10. The present invention makes use of the available navigation/position information concerning aircraft 10 to determine the position of friendly equipment and/or vehicles (hereinafter referred to as vehicles) on the ground. Friendly vehicles on the ground are indicated by points $V_1$, $V_2$, ....

As is known in the art, a variety of systems and methods may be used by aircraft 10 and vehicles $V_1$, $V_2$, .... to determine the friendly nature of vehicles $V_1$, $V_2$, .... In a simple IFF embodiment, vehicles $V_1$, $V_2$, .... transmit an infrared signal that may be seen/detected by aircraft 10. Presence of the infrared signal is indicative of a friendly vehicle. More typically, vehicles $V_1$, $V_2$, .... are equipped with means (not shown in this figure) to encode (e.g. high speed pulsing) the infrared signal, while aircraft 10 is equipped with means (not shown in this figure) to decode such a signal to determine if the encoding is valid. The complexity/security of the system may be further increased by providing aircraft 10 with interrogation means (not shown in this figure) to generate an encoded interrogation signal that, when detected by a friendly vehicle $V_1, V_2, \ldots$, activates the infrared transmitting means located on vehicles $V_1, V_2, \ldots$. It is to be understood that while one of these well known systems/methods will be utilized by the present invention, the choice of same is a design consideration that does not affect the novelty of the present invention. Accordingly, details of the "classic" IFF aspect of the present invention will be kept to a minimum. Furthermore, as will be explained in greater detail hereinbelow, the coded signal emitted from each friendly vehicle $V_1$, $V_2, \ldots$ could identify the vehicle as friendly and contain information that uniquely identifies the particular vehicle. Such unique identification will aid at the command level when attempting to assess the capability of friendly forces at any given time.

The final component needed to assess friendly forces at the command level is the position of each friendly vehicle $V_1, V_2, \ldots$. Determination of friendly vehicle position within an IFF system embodies the novel aspects of the present invention. As shown in FIG. 1, aircraft 10 is provided with means (not shown in this figure) to generate a video image of an area bounded by the rectangle 50. For ease of description only friendly vehicle $V_1$ appears in the area 50. However, as will be readily apparent, the method can be easily extended to the handling of a plurality of friendly vehicles within area 50. Aircraft 10 is also provided with ranging apparatus (not shown in this figure) that determines a range r from aircraft 10 to some reference point in the area 50 being imaged. One type of ranging apparatus is a laser range finder. The reference point is typically chosen as the center 51 of the area 50. As a result, a video image of area 50 is generated and the range r from aircraft 10 to the center 51 is known. Furthermore, using the navigation/position information concerning aircraft 10, the actual position (i.e, latitude and longitude) of center 51 may be determined. For example, for the simplest case shown in FIG. 1, the center 51 of area 50 is located directly beneath aircraft 10, thereby making the latitude and longitude of center 51 equal to that of aircraft 10. Should the area being imaged lead or trail aircraft 10, latitude and longitude at the center of the imaged area is easily determined by using an associated look ahead/behind angle, the range to the center of the imaged area, and a known/assumed earth topography.

It is assumed at this point in the discussion that vehicle $V_1$ is transmitting a coded signal S skyward such that aircraft 10 can detect the presence of same. As explained above, the coded signal S may be transmitted continuously or may have been remotely activated by, for example, a valid interrogation signal. It may also be assumed at this point that the coded signal S is encoded (and subsequently decoded onboard aircraft 10) by methods well known in the art to identify vehicle $V_1$ uniquely and as being friendly. With respect to the present invention, it is only required that the coded signal S be detectable by the means generating the video image of area 50. Accordingly, coded signal S may be pulsed to contain the particular friendly and unique identification codes and may be of a video detectable infrared color. Alternatively, coded signal S may comprise two (video detectable) visible or infrared colors that are turned on and off in a predetermined coded pattern to provide the necessary information.

Figure 2:
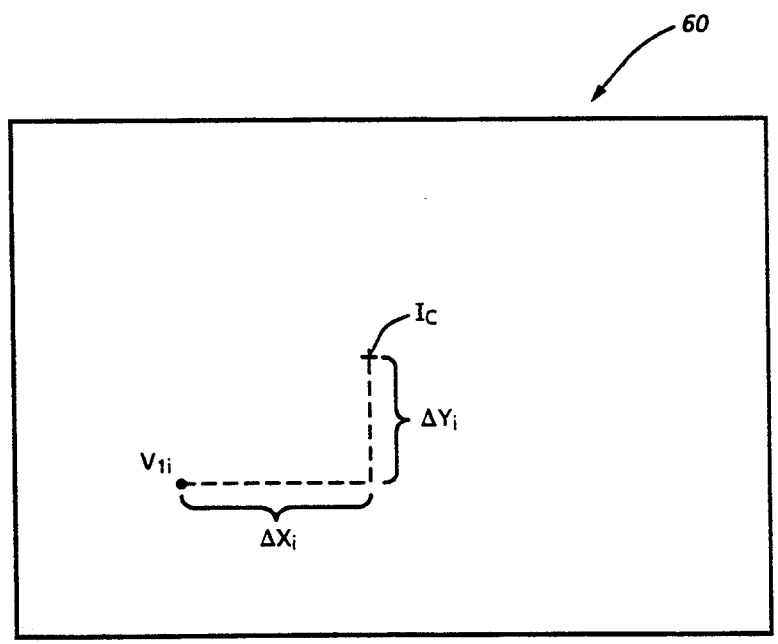
FIG. 2 is a video image of the area of interest defined in FIG. 1.

A video image 60 of area 50 is shown in FIG. 2. The video image 60, like any video image, is defined by a matrix of pixels. The center of video image 60, or image center $I_c$ as it will be referred to hereinafter, is known in terms of coordinates in the matrix of pixels. Any friendly vehicle within area 50 may be detected as a vehicle image and represented in video image 60 such that an angular position thereof can be represented by image offset distances from the center $I_c$ in terms of the video image 60. For the example being described, friendly vehicle $V_1$ is represented in video image 60 as image $V_{1i}$. Image $V_{1i}$ is defined in terms of offset distances $\Delta x_i$ (image offset from the image center $I_c$ in a direction perpendicular to the body axis of aircraft 10) and $\Delta y_i$ (image offset from image center $I_c$ in a direction along the body axis of aircraft 10). The angular image distances $\Delta x_i$ and $\Delta y_i$ can be combined with the aircraft's attitude measurements to obtain actual angular offsets of the vehicle $V_1$ in the north and east directions. For an assumed earth topography, the angular offsets can be combined with the range r to the center 51 of image area 50 to approximately obtain offsets of vehicle $V_1$ in latitude and longitude with respect to those of the center 51. The height of vehicle $V_1$ can also be determined from geometrical relationships well known in the art. Further processing of the detected coded signal S enables vehicle $V_1$ to be recognized as friendly and uniquely identified according to a method well known in the art.

Figure 3:
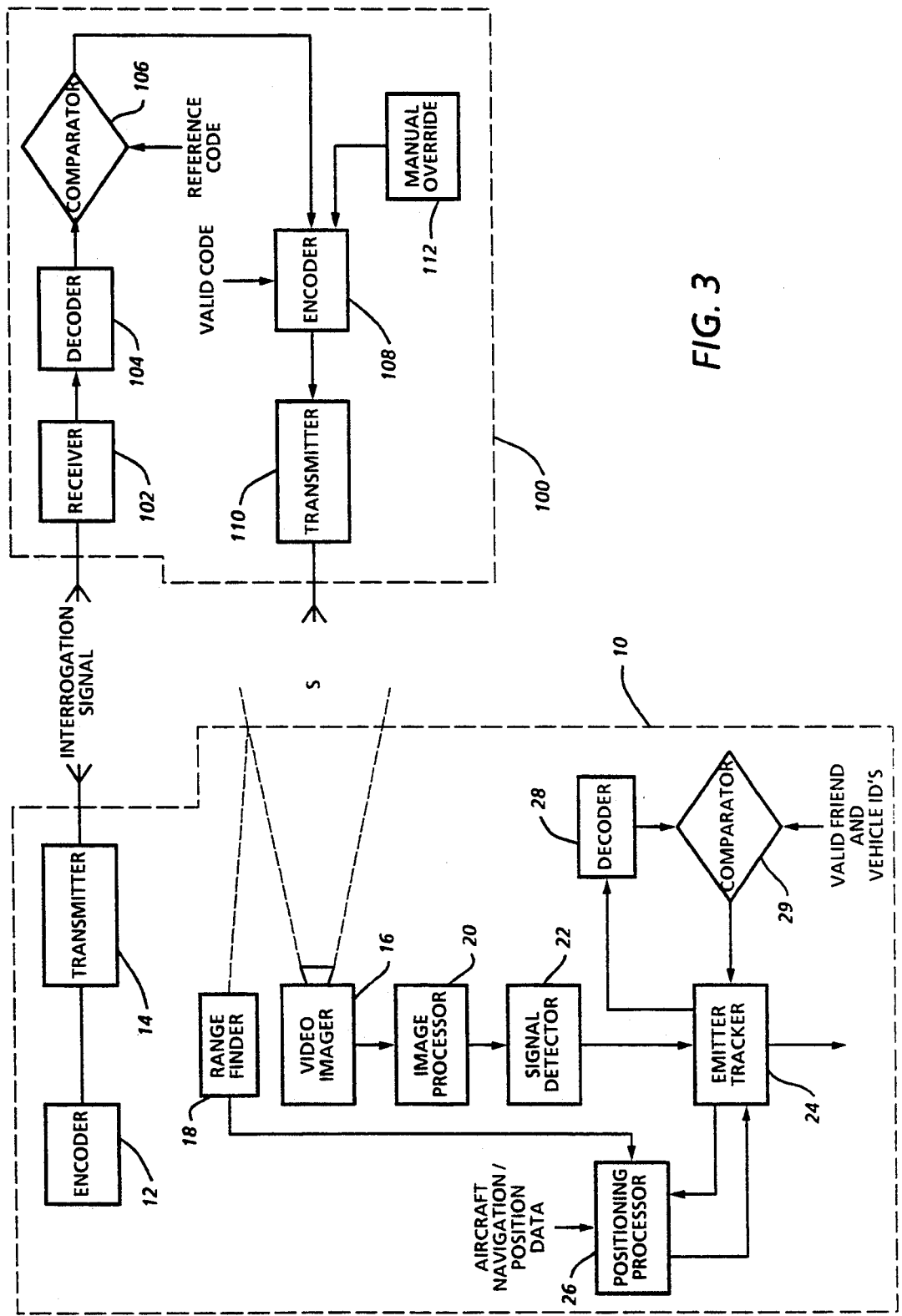
FIG. 3 is a block diagram of a preferred embodiment apparatus for carrying out the method of the present invention.

A preferred embodiment apparatus for carrying out the above described method will now be explained with reference to the block diagram of FIG. 3 and continued reference to FIG. 1 and FIG. 2. For sake of completeness, the preferred embodiment apparatus will be described with respect to an interrogation based IFF system. However, it is to be understood that the interrogation aspect may be omitted without affecting the novel positioning method and apparatus of the present invention. The elements contained within the dotted line box referenced by the numeral 10 are found onboard aircraft 10 while those elements contained within the dotted line box referenced by the numeral 100 are found onboard each of the friendly vehicles $V_1, V_2, \ldots$. For purposes of the following description, it will be assumed that vehicle 100 is vehicle $V_1$.

Onboard aircraft 10, an encoder 12 supplies a given code to a transmitter 14 which transmits an INTERROGATION SIGNAL. The INTERROGATION SIGNAL must propagate from aircraft 10 such that it is detectable by at least any friendly vehicle within the area 50 to be imaged. Onboard vehicle 100, a receiver 102 detects the INTERROGATION SIGNAL which is then decoded at a decoder 104. The decoded INTERROGATION SIGNAL is passed to a comparator 106 that is supplied with a REFERENCE CODE. Assuming that vehicle 100 is friendly, comparator 106 indicates that a match has occurred which in turn activates encoder 108 supplied with a VALID CODE word. The VALID CODE word would include information indicating that vehicle 100 is friendly as well as its unique identity. The VALID CODE is transmitted as the coded signal S by transmitter 110. As described above, coded signal S may comprise a single pulsed visible or infrared color signal, or may comprise two visible or infrared colors turned on and off according to a predetermined coded pattern. A manual override 112 may be provided to allow a user the option of continuously outputting coded signal S. This option may be desirable under certain battle conditions.

Back onboard aircraft 10, the coded signal S is detected by a video imager 16, e.g. a camera sensitive to the presence of coded signal S. In accordance with the above described method of the present invention, video imager 16 and a range finder (e.g. laser range finder) 18 onboard aircraft 10 are synchronized to respectively generate video image 60 of area 50 and continuously provide the range r to the center 51 of area 50.

Each frame of the video image 60 is provided to an image processor 20 in order to determine the image offset distances $\Delta x_i$ and $\Delta y_i$ between the image center $I_c$ and vehicle image $V_{1i}$. A signal detector 22 detects the pixel associated with vehicle image $V_{1i}$. As described above, the detected pixel for coded signal S (as well as for each additional coded signal detected within area 50) is defined in terms of matrix coordinates within video image 60. The matrix coordinates and coding associated with coded signal S are passed to an emitter tracker 24.

Emitter tracker 24 stores information associated with each vehicle detected within area 50 in terms of matrix coordinates. A positioning processor 26 uses the image offset distances, range r and navigation/position data from the aircraft's GPS and INS systems to approximate the latitude, longitude and height of vehicle 100 for an assumed earth topography, e.g. a flat earth. The position of vehicle $V_1$ (as well as any other vehicle transmitting a coded signal within area 50) is returned to emitter tracker 24 and stored in terms of the corresponding matrix coordinates.

Simultaneously, the coding associated with coded signal S is decoded by a decoder 28. A comparator 29, supplied with a VALID FRIEND code and a list of VALID VEHICLE ID'S compares same with the decoded signal. The output of comparator 29 is supplied to emitter tracker 24 and stored in terms of the corresponding matrix coordinates. Assuming that vehicle 100 is friendly, the content of the coded signal S uniquely identifies vehicle 100 as vehicle $V_1$ for command level purposes. Specific models of encoders, decoders, comparators, transmitters and receivers are design choices not affecting the novelty of the present invention.

The advantages of the present invention are numerous. The method and apparatus of the present invention provides not only for the recognition of a ground-based vehicle as a friend and for the unique identification of the vehicle, but also determines the position of the vehicle for command level observation. Current IFF systems, both simple and complex, could make use of the position method and apparatus of the present invention by, in most cases, merely outfitting aircraft with video, ranging and processing means as described hereinabove. In this way, the already available sophisticated navigation and position systems onboard aircraft can be utilized in an added dimension.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An Identification Friend or Foe (IFF) and position identification system for identifying a friendly transmission and its transmit position, comprising:
   video image means for generating a video image of an area of interest;
   range finding means for providing range from said video image means to a reference position within the area of interest, the reference position further being defined in terms of the video image;
   a transmitter, positioned in the area of interest, for transmitting a coded signal, the coded signal identifying said transmitter uniquely and identifying said transmitter as a friend, the coded signal further being detectable by said video image means to indicate a transmitter position defined in terms of the video image; and
   image processing means for determining offset distances between the reference position and the transmitter position in terms of the video image, wherein range to the reference position and the determined offset distances are used to determine an approximate position of said transmitter in the area of interest.

2. A system as in claim 1 further comprising means for remotely activating said transmitter to transmit the coded signal.

3. A system as in claim 1 wherein said range finding means comprises a laser range finder.

4. A system as in claim 1 wherein said transmitter comprises means for generating a pulsed infrared light signal as the coded signal.

5. An Identification Friend or Foe (IFF) system for detecting i) friendly ground-based equipment/vehicles, ii) each of the equipment/vehicle's unique identity, and iii) each of the equipment vehicle's approximate position, comprising:
   video image means, located on an aircraft, for generating a video image of an area of interest on the ground, wherein the video image is defined by a matrix of pixels;
   range finding means, located on the aircraft and synchronized with said video image means, for providing a range from said video image means to a reference position within the area of interest, the reference position being defined by known latitude, longitude and height within the area of interest and further being defined in the video image's matrix of pixels by matrix coordinates;
   a transmitter, located on each friendly ground-based equipment/vehicle, for transmitting a coded signal that uniquely identifies each of said transmitters and identifies each of said transmitters as friendly, the coded signal further being detectable by said video image means when the coded signal is transmitted from the area of interest, wherein positions of each of said transmitters within the area of interest are defined in the video image's matrix of pixels by matrix coordinates; and
   image processing means, located on the aircraft, for determining east-west and north-south offset distances between the reference position defined by matrix coordinates and each of said transmitter's positions defined by matrix coordinates, wherein the range to the reference position and the determined offset distances for each of said transmitter's positions are used to determine said transmitter's latitude, longitude and height within the area of interest.

6. A system as in claim 5 further comprising:
   means, located on the aircraft, for transmitting an interrogation signal towards the ground; and
   means, located on each of the ground-based equipment/vehicles, for detecting the interrogation signal wherein said transmitter transmits the coded signal only in response to detection of the interrogation signal.

7. A system as in claim 6 wherein said means for detecting comprises:
   a receiver for receiving the interrogation signal;
   reference code producing means for producing a predetermined reference code when the interrogation signal is received; and
   means for comparing the interrogation signal with the predetermined reference code, wherein a valid code signal is generated when the interrogation signal and the predetermined reference code signal are highly correlated, and wherein the valid code signal activates said transmitter to send the coded signal.

8. A system as in claim 5 wherein said range finding means comprises a laser range finder synchronized to range on the center of the video image.

9. A system as in claim 5 wherein said transmitter comprises means for generating a pulsed infrared light signal as the coded signal.

10. An Identification Friend or Foe (IFF) method for detecting i) friendly ground-based equipment/vehicles, ii) each of the equipment/vehicle's unique identity, and iii) each of the equipment vehicle's approximate position, comprises the steps of:
   generating a video image of an area of interest on the ground from an aircraft, wherein the video image is defined by a matrix of pixels;
   measuring a range from the aircraft to a reference position within the area of interest, the reference position being defined by known latitude and longitude within the area of interest and further being defined in the matrix of pixels by matrix coordinates;
   transmitting a coded signal from each friendly ground-based equipment/vehicle that uniquely identifies each equipment/vehicle and identifies each equipment/vehicle as friendly;
   detecting transmitting positions of the coded signal in terms of the video image when the coded signal is transmitted from the area of interest, wherein each detected transmitting position within the area of interest is defined in the matrix of pixels by matrix coordinates; and
   determining offset distances between the reference position defined by matrix coordinates and each detected transmitting position defined by matrix coordinates, wherein the range to the reference position and determined offset distances are used to determine latitude, longitude and height of each friendly ground-based equipment/vehicle within the area of interest.

11. A method according to claim 10 wherein the reference position is located at the center of the matrix of pixels.

12. A method according to claim 10 wherein the coded signal is a pulsed infrared signal.

13. A method according to claim 10 wherein the coded signal is a two-color, pulsed infrared signal.

14. A method according to claim 10 further comprises the steps of:
   transmitting an interrogation signal from the aircraft; and
   detecting, at each friendly-based equipment/vehicle, the interrogation signal wherein the coded signal is transmitted only in response to the interrogation signal.

15. A method according to claim 14 wherein said step of detecting the interrogation signal comprises the steps of:
   receiving the interrogation signal;
   producing a predetermined reference code upon receipt of the interrogation signal; and
   comparing the interrogation signal with the predetermined reference code, wherein the coded signal is transmitted when the interrogation signal and the predetermined reference code signal are highly correlated.

* * * * *